US011906933B2

(12) United States Patent
Amano

(10) Patent No.: US 11,906,933 B2
(45) Date of Patent: Feb. 20, 2024

(54) DIAL AND TIMEPIECE

(71) Applicant: Casio Computer Co., Ltd., Tokyo (JP)

(72) Inventor: Masao Amano, Uenohara (JP)

(73) Assignee: Casio Computer Co., Ltd., Tokyo (JP)

( * ) Notice: Subject to any disclaimer, the term of this patent is extended or adjusted under 35 U.S.C. 154(b) by 526 days.

(21) Appl. No.: 17/088,190

(22) Filed: Nov. 3, 2020

(65) Prior Publication Data

US 2021/0141342 A1 May 13, 2021

(30) Foreign Application Priority Data

Nov. 7, 2019 (JP) ................................ 2019-202341

(51) Int. Cl.
*G04B 19/12* (2006.01)
*G04B 19/10* (2006.01)

(52) U.S. Cl.
CPC ............ *G04B 19/12* (2013.01); *G04B 19/10* (2013.01)

(58) Field of Classification Search
CPC ......... G04B 19/06; G04B 19/10; G04B 19/12
See application file for complete search history.

(56) References Cited

U.S. PATENT DOCUMENTS 3,786,627 A * 1/1974 Takagi .................. G04B 19/12 968/156
7,619,948 B2 11/2009 Takasawa
9,739,648 B2 * 8/2017 Takeda .................. G01D 13/02
2007/0008828 A1 * 1/2007 Takasawa ............. G04B 19/06 368/232
2008/0013409 A1 * 1/2008 Bland .................... G04B 45/02 368/223
2016/0070238 A1 * 3/2016 Dubois ................ G04G 17/045 368/84
2019/0078209 A1 * 3/2019 Boccard ................ C23C 16/405
2019/0163138 A1 * 5/2019 Erard ................ G04B 45/0015
2021/0141342 A1 5/2021 Amano

FOREIGN PATENT DOCUMENTS

JP 60-92839 A 5/1985
JP 2007-040970 A 2/2007
JP 2008-249450 A 10/2008
JP 2018-146504 A 9/2018
JP 2021076442 A 5/2021

OTHER PUBLICATIONS

Japanese Notice of Reasons for Refusal dated Jul. 6, 2021, for the corresponding Japanese Patent Application No. 2019-202341, 14 pages. (With English Machine Translation).
Japanese Notice of Reasons for Refusal dated Oct. 17, 2023, for the corresponding Japanese Patent Application No. 2022-006996, 8 pages. (With English Machine Translation).

* cited by examiner

*Primary Examiner* — Edwin A. Leon
*Assistant Examiner* — Jason M Collins
(74) *Attorney, Agent, or Firm* — Seed IP Law Group LLP

(57) ABSTRACT

A dial including a base member having a sheet shape containing reinforced fibers, and a decorative member provided on one surface of the base member containing a brittle material.

11 Claims, 5 Drawing Sheets

DIAL AND TIMEPIECE

CROSS-REFERENCE TO RELATED APPLICATION

This application is based upon and claims the benefit of priority from the prior Japanese Patent Application No. 2019-202341, filed Nov. 7, 2019, the entire contents of which are incorporated herein by reference.

BACKGROUND

1. Technical Field

The technical field relates to a dial that is used in electronic devices such as timepieces, portable communication devices, and personal digital assistants, and a timepiece equipped with the dial.

2. Description of the Related Art

For example, a dial for timepieces is known which has a structure where a first film has been provided on one surface of a sheet material formed by glass fibers being woven and a second film has been provided on the other surface of the sheet material, as described in Japanese Patent Application Laid-Open (Kokai) Publication No. 2007-040970.

SUMMARY

One embodiment is a dial comprising: a base member having a sheet shape containing reinforced fibers, and a decorative member provided on one surface of the base member containing a brittle material.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

First Embodiment

Figure 1:
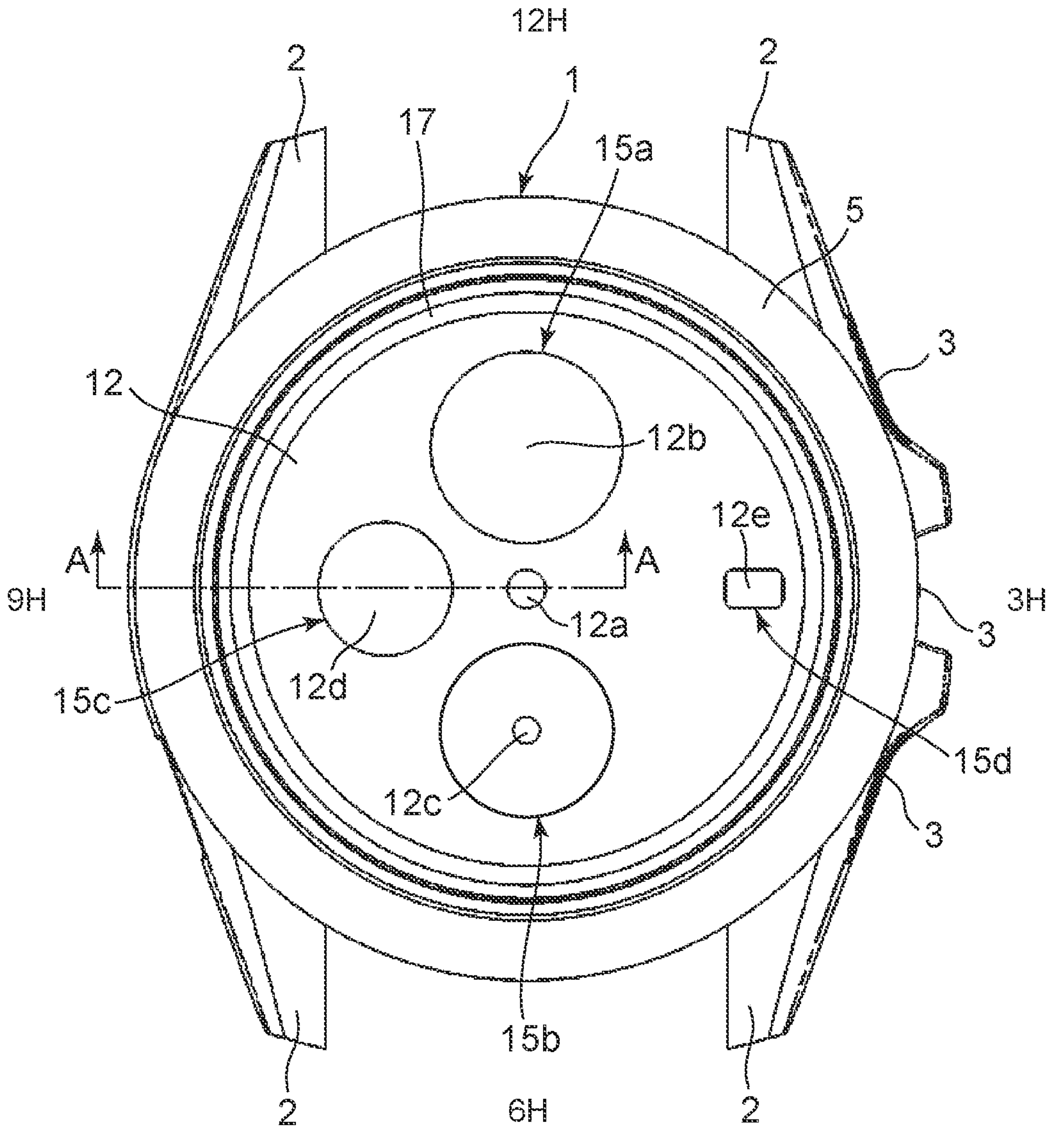
FIG. 1 is an enlarged front view of a first embodiment related to a wristwatch.

A first embodiment related to a wristwatch will hereinafter be described with reference to FIG. 1 to FIG. 4B. This wristwatch has a wristwatch case 1, as shown in FIG. 1. On the twelve o'clock side and six o'clock side of the wristwatch case 1, band attachment sections 2 are provided to which watch bands (not shown) are attached. Also, on the two o'clock side, three o'clock side, and four o'clock side of the wristwatch case 1, switch sections 3 are provided.

Figure 2:
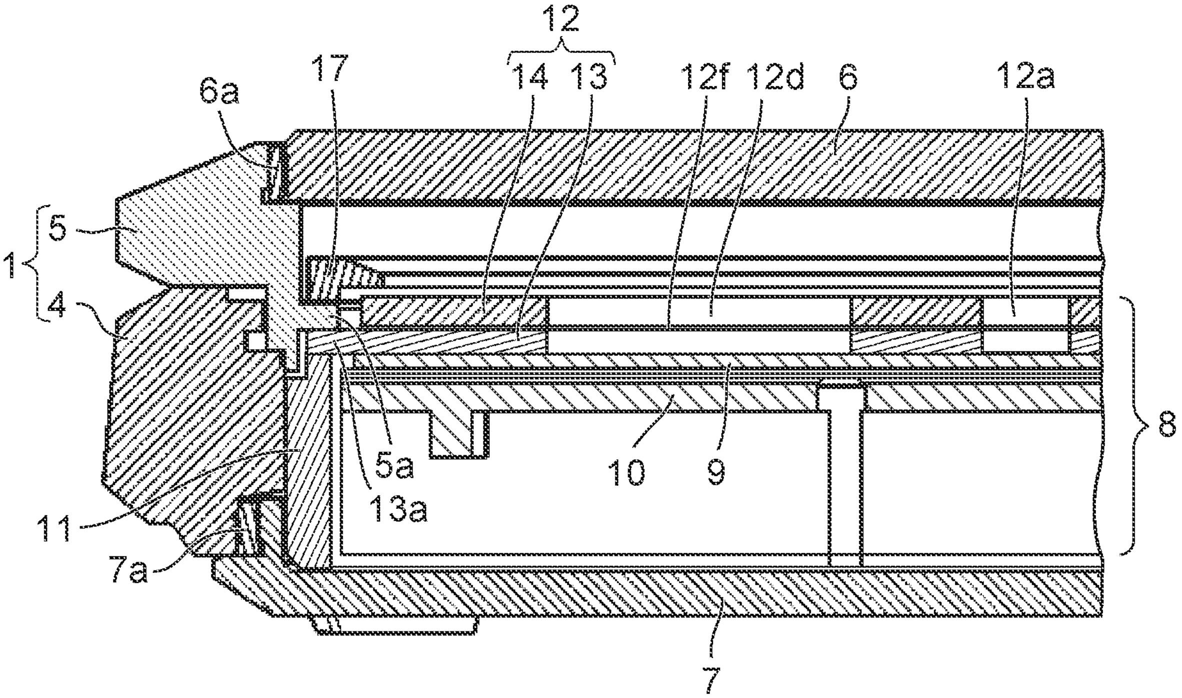
FIG. 2 is an enlarged sectional view of a main portion of the wristwatch taken along line A-A shown in FIG. 1.

This wristwatch case 1 includes a first case 4 and a second case 5, as shown in FIG. 1 and FIG. 2. The first case 4 is a main body case made of metal or hard synthetic resin. The second case 5 is a bezel made of metal or hard synthetic resin as with the first case 4, and is integrally provided on the upper part of the first case 4.

To the upper opening of the wristwatch case 1, that is, to the upper opening of the second case 5, a watch glass 6 is attached via a packing 6*a*, as shown in FIG. 1 and FIG. 2. Also, to the bottom of the wristwatch case 1, that is, to the bottom of the first case 4, aback cover 7 is attached via a waterproof ring 7*a*. Also, in the wristwatch case 1, a timepiece module 8 is housed.

This timepiece module 8 has a housing 10, as shown in FIG. 2. Although not shown in the drawing, this housing 10 has provided therein a plurality of timepiece movements which indicates and displays information such as clock time by moving a plurality of pointers individually, a display section which displays information such as a date, a day of the week, and the like, an antenna which receives radio waves such as standard time radio waves, a circuit board which drives and controls these sections, and various types of parts required for a clock function, such as a secondary battery.

The housing 10 has a middle frame 11 made of synthetic resin and provided on its outer circumferential portion, and is structured to be mounted in the first case 4 of the wristwatch case 1 by this middle frame 11, as shown in FIG. 2. On the upper surface of the housing 10, a dial 12 is provided via a solar panel 9.

Figure 3A:
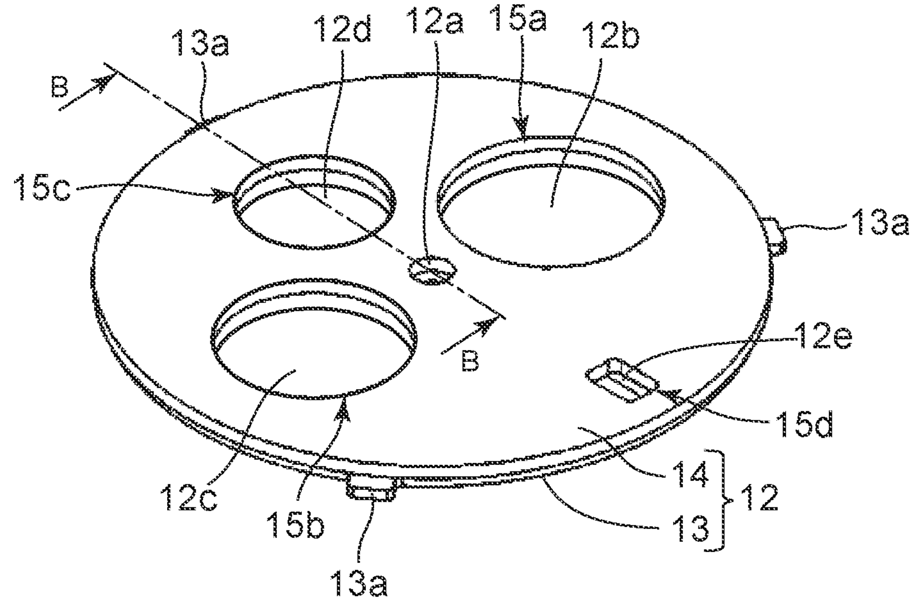
FIG. 3A is an enlarged perspective view of a dial shown in FIG. 2.
Figure 3B:
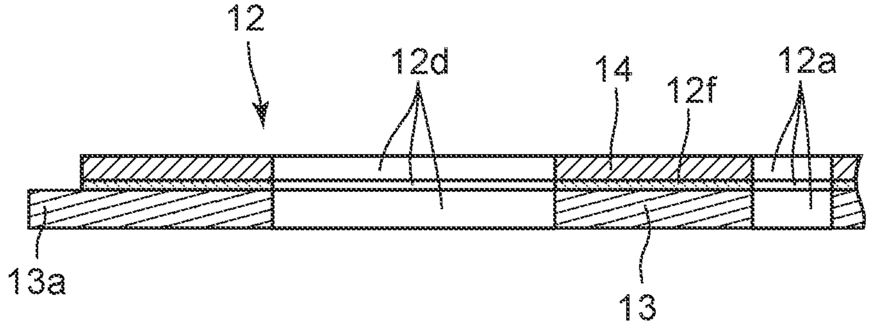
FIG. 3B is an enlarged sectional view of a main portion of the dial taken along line B-B shown in FIG. 3A.

The dial 12 includes a base plate 13 that is a base member, and a decorative plate 14 that is a decorative member, as shown in FIG. 3A and FIG. 3B. More specifically, the dial 12 has a structure where the decorative plate 14 has been attached to the upper surface of the base plate 13 by an adhesive material 12*f* such as a double coated adhesive tape or a liquid adhesive agent.

In this embodiment, the dial 12 has a main display area and first to fourth sub display areas 15*a* to 15*d*, as shown in FIG. 1, FIG. 3A and FIG. 3B. The main display area is an area where pointers (not shown) are moved above the entire dial 12. In this main display area, a shaft insertion hole 12*a* into which a pointer shaft (not shown) is inserted is provided penetrating vertically through the dial 12.

The first sub display area 15*a* is a circular area which is provided on the 12 o'clock side of the dial 12 and in which a first sub pointer (not shown) is moved, as shown in FIG. 1 and FIG. 3A. This first sub display area 15*a* is structured such that a first circular hole 12*b* that is an opening corresponding to its circular shape is provided penetrating vertically through the dial 12 and a first sub pointer shaft (not shown) is provided at the center of this first circular hole 12*b*.

The second sub display area 15*b* is a circular area which is provided on the 6 o'clock side of the dial 12 and in which second sub pointers (not shown) are moved, as shown in FIG. 1 and FIG. 3A. This second sub display area 15*b* is structured such that a second circular hole 12*c* that is an opening corresponding to its circular shape is provided penetrating vertically through the dial 12 and a second sub pointer shaft (not shown) is provided at the center of this second circular hole 12*c*.

The third sub display area 15*c* is a circular area which is provided on the 9 o'clock side of the dial 12 and in which a third sub pointer (not shown) is moved, as shown in FIG. 1, FIG. 3A and FIG. 3B. This third sub display area 15*c* is structured such that a third circular hole 12*d* that is an opening corresponding to its circular shape is provided penetrating vertically through the dial 12 and a third sub pointer shaft (not shown) is provided at the center of this third circular hole 12*d*.

The fourth sub display area 15*d* is a quadrangular area provided on the 3 o'clock side of the dial 12, as shown in FIG. 1 and FIG. 3A. This fourth sub display area 15*d* is structured such that a quadrangular display opening section 12*e* corresponding to its quadrangular shape is provided penetrating vertically through the dial 12. Also, this fourth sub display area 15*d* is structured such that a display section (not shown) of the timepiece module 8 is correspondingly arranged thereunder so that information regarding a date, a day of the week, or the like displayed on this display section can be seen from above.

In addition to being required to have adequate strength, the dial 12 is required to allow radio wave reception that is performed by the antenna (not shown) in the timepiece module 8, and therefore a material other than metal is required to be used for the dial 12, as shown in FIG. 2 to FIG. 4B. Accordingly, in order to satisfy these conditions, the base plate 13 has a structure using carbon fibers 16 that are reinforced fibers.

Figure 4A:
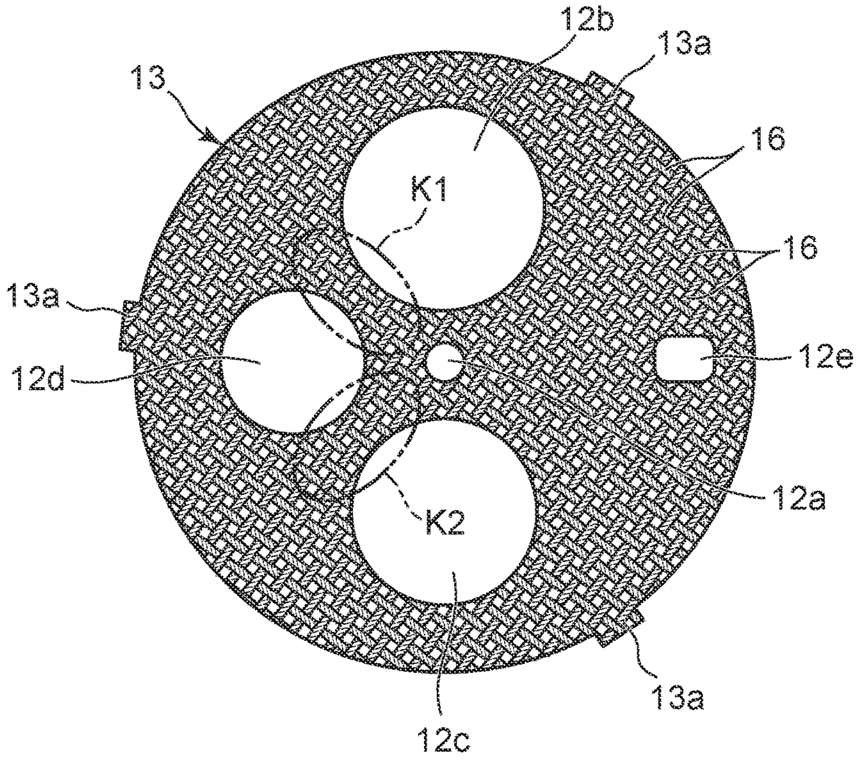
FIG. 4A is an enlarged front view of a base plate of the dial shown in FIG. 3A and FIG. 3B.

That is, this base plate 13 includes sheet materials each of which is acquired by carbon fibers 16 that are reinforced fibers being vertically and horizontally woven by plain weave and coated with epoxy resin, and has a structure where these sheet materials have been laminated with their carbon fibers 16 being directionally aligned, as shown in FIG. 3A, FIG. 3B and FIG. 4A. In this embodiment, each bundle of carbon fibers 16 includes one thousand carbon fibers 16.

In this base plate 13, the shaft insertion hole 12*a* of the main display area, the first circular hole 12*b* corresponding to the first sub display area 15*a*, the second circular hole 12*c* corresponding to the second sub display area 15*b*, the third circular hole 12*d* corresponding to the third sub display area 15*c*, and the display opening section 12*e* of the fourth sub display area 15*d* are provided penetrating in the vertical direction, as shown in FIG. 3A, FIG. 3B and FIG. 4A.

On the base plate 13 of this embodiment, among the shaft insertion hole 12*a*, the first to third circular holes 12*b* to 12*d*, and the display opening section 12*e*, the first circular hole 12*b* and the third circular hole 12*d* have a first in-between section K1 provided therebetween and having a narrow width, and the second circular hole 12*c* and the third circular hole 12*d* have a second in-between section K2 provided therebetween and having a narrow width, as shown in FIG. 4A.

As a result, the base plate 13 is provided such that part of the carbon fibers 16 passes through the first in-between section K1 and the second in-between section K2 of the base plate 13 without being cut off, as shown in FIG. 4A. More specifically, in this base plate 13, the shaft insertion hole 12*a*, the first to third circular holes 12*b* to 12*d*, and the display opening section 12*e* are formed after the base plate 13 is rotated by 45 degrees with the carbon fibers 16 being vertically and horizontally woven by plain weave. Also, in this base plate 13, part of the carbon fibers 16 from the center portion provided with the shaft insertion hole 12*a* to the outer circumferential portion is provided without being cut off, as shown in FIG. 4A.

As a result, on the base plate 13, the first in-between section K1 between the first circular hole 12*b* and the third circular hole 12*d* is formed at a slant angle of 45 degrees toward a middle point between the 10 o'clock side and the 11 o'clock side from the center of the base plate 13, that is, the shaft insertion hole 12*a* of the main display area, as shown in FIG. 4A. Accordingly, on the base plate 13, part (one bundle of fibers in the case of the present embodiment) of the vertical or horizontal fibers (in the example, the horizontal fibers) among the carbon fibers 16 vertically and horizontally woven by plain weave is provided to pass through the first in-between section K1 without being cut off.

Similarly, on the base plate 13, the second in-between section K2 between the second circular hole 12*c* and the third circular hole 12*d* is formed at a slant angle of 45 degrees toward a middle point between the 7 o'clock side and the 8 o'clock side from the center of the base plate 13, that is, the shaft insertion hole 12*a* of the main display area, as shown in FIG. 4A. Accordingly, on the base plate 13, part (two bundles of fibers in the case of the present embodiment) of the vertical or horizontal fibers (in the example, the vertical fibers) among the carbon fibers 16 vertically and horizontally woven by plain weave is provided to pass through the second in-between section K2 without being cut off.

As a result, the base plate 13 is structured such that the strength of the first in-between section K1 is increased by the part of the carbon fibers 16 passing through the first in-between section K1 without being cut off, and the strength of the second in-between section K2 is increased by the part of the carbon fibers 16 passing through the second in-between section K2 without being cut off, as shown in FIG. 4A. By this structure, the strength of the entire base plate 13 is increased even though the shaft insertion hole 12*a*, the first to third circular holes 12*b* to 12*d*, the display opening section 12*e*, and the first and second in-between sections K1 and K2 are provided.

On the other hand, the decorative plate 14 of the dial 12 is formed in a plate shape by use of a highly decorative brittle material, such as a shellfish including a green turban shell and an abalone shell, or a natural or artificial precious stone including an aventurine, a sapphire, and a jade, as shown in FIG. 2 to FIG. 3B and FIG. 4B. In this embodiment, by use of a shellfish such as a green turban shell and an abalone shell, the decorative plate 14 is formed having a discoid outer shape which is substantially the same as that of the base plate 13.

Figure 4B:
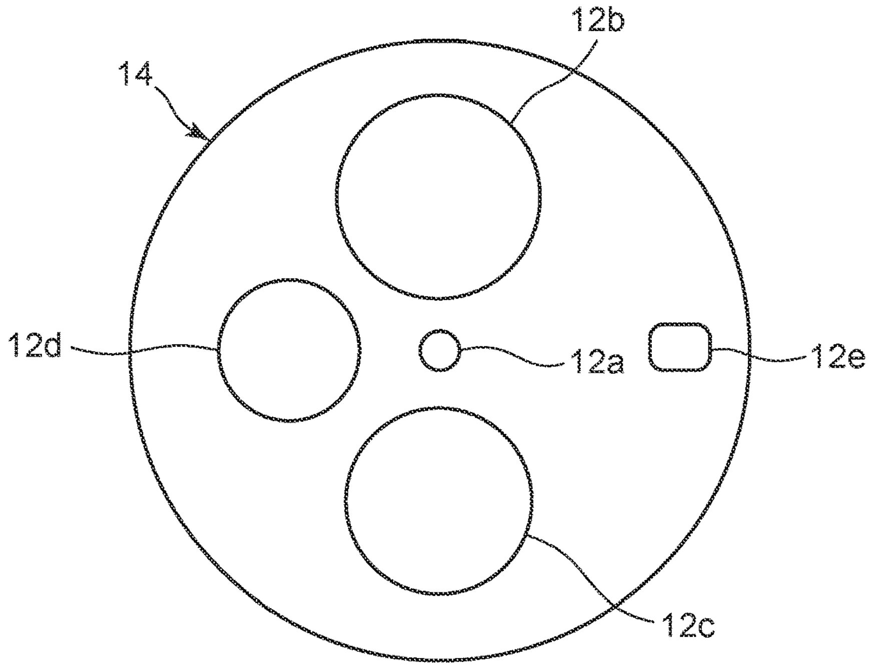
FIG. 4B is an enlarged front view of a decorative plate of the dial shown in FIG. 3A and FIG. 3B.

In this decorative plate 14, as with the base plate 13, the shaft insertion hole 12*a* of the main display area, the first circular hole 12*b* corresponding to the first sub display area 15*a*, the second circular hole 12*c* corresponding to the second sub display area 15*b*, the third circular hole 12*d* corresponding to the third sub display area 15*c*, and the display opening section 12*e* of the fourth sub display area 15*d* are provided penetrating in the vertical direction, as shown in FIG. 3A, FIG. 3B and FIG. 4B.

Also, since the decorative plate 14 is made of a brittle material, its thickness is formed within the range of 0.4 mm to 2.0 mm in consideration of a correlation relationship between its strength and the slimming down of its entire body. In this embodiment, the thickness of the decorative plate 14 is formed to be about 0.7 mm. If the decorative plate 14 is thick, it can be easily manufactured. However, the entire dial 12 becomes thick, which makes the entire timepiece module 8 thick. Accordingly, for the slimming down of the timepiece module 8, the decorative plate 14 should preferably be thin even though it is made of a brittle material.

When a shellfish such as a green turban shell and an abalone shell is processed to be in a thin plate shape as the decorative plate 14, a design is expressed which is highly decorative as mother-of-pearl work. Also, when a natural or artificial precious stone such as an aventurine, a sapphire and a jade is processed to be in a thin plate shape as the decorative plate 14, a design is expressed which gives a sophisticated feeling by using the material itself of the precious stone. As a result, the dial 12 is structured such that, by the strength of the base plate 13 being ensured, the decorative plate 14 is prevented from being deformed and broken, and enhances the design.

Also, in order to achieve shock resistance, the dial 12 is structured such that the decorative plate 14 is provided in the wristwatch case 1 in a manner not to come in contact with the wristwatch case 1, as shown in FIG. 2. More specifically, on outer circumferential portions of the base plate 13, a plurality of projection sections 13*a* are provided projecting outside the outer circumference of the decorative plate 14 in the planar direction, as shown in FIG. 3A, FIG. 3B and FIG. 4A. In this embodiment, the dial 12 is structured such that, when the base plate 13 is arranged on the upper surface of the housing 10, the base plate 13 and the decorative plate 14 are arranged on the upper rim of the middle frame 11.

As a result, the dial 12 is structured to be held in the wristwatch case 1 with the housing 10 being arranged in the first case 4 of the wristwatch case 1 via the middle frame 11 and the plurality of projection sections 13*a* of the base plate 13 being held between a ring-shaped flange section 5*a* provided on the inner lower surface of the second case 5 and the middle frame 11, as shown in FIG. 2 to FIG. 4B.

In this embodiment, the decorative plate 14 is structured to be arranged such that its outer circumferential surface does not at all come in contact with the inner circumferential surface of the flange section 5*a* of the second case 5, as shown in FIG. 2 to FIG. 3B and FIG. 4B. Also, the outer circumferential portion of this decorative plate 14 is covered by a ring-shaped parting member 17 provided on the upper surface of the flange section 5*a* of the second case 5, as shown in FIG. 1 and FIG. 2.

In this embodiment, the parting member 17 is provided on the upper surface of the flange section 5*a* of the second case 5 such that the base plate 13 is held by the upper surfaces of the plurality of projection sections 13*a* of the base plate 13 being pressed against the undersurface of the flange section 5*a* of the second case 5, and whereby the parting member 17 does not come in contact with the decorative plate 14 even when the wristwatch case 1 is subject to external impact.

The solar panel 9, which is arranged on the undersurface of the dial 12, is structured to be irradiated with external light through the first to third circular holes 12*b* to 12*d* provided in the dial 12, as shown in FIG. 2. As a result, this solar panel 9 is structured such that it generates electricity by being irradiated with external light through the first to third circular holes 12*b* to 12*d* of the dial 12, and this generated electricity is supplied to and stored in the secondary battery (not shown) of the timepiece module 8.

Next, the mechanism of this wristwatch is described. When the user looks at the wristwatch, the decorative plate 14 of the dial 12 is normally seen from the outside of the wristwatch case 1 through the watch glass 6. That is, the design of the dial 12 is enhanced by the decorative plate 14.

More specifically, in the case where a shellfish such as a green turban shell and an abalone shell has been processed to be in a thin plate shape as the decorative plate 14, the design is expressed which is highly decorative as mother-of-pearl work. Also, in the case where a natural or artificial precious stone such as an aventurine, a sapphire, and a jade has been processed to be in a thin plate shape as the decorative plate 14, the design is expressed which gives a sophisticated feeling by using the material itself of the precious stone.

In this embodiment, the base plate 13 of the dial 12 includes the sheet materials each of which is acquired by the carbon fibers 16 that are reinforced fibers being vertically and horizontally woven by plain weave and coated with epoxy resin, and has the structure where these sheet materials have been laminated with their carbon fibers 16 being directionally aligned. Accordingly, the strength of the base plate 13 is ensured, whereby the decorative plate 14 is prevented from being deformed and broken.

Also, in this embodiment, even though the base plate 13 includes the shaft insertion hole 12*a*, the first to third circular holes 12*b* to 12*d*, the display opening section 12*e*, the first in-between section K1 having a narrow width and provided between the first circular hole 12*b* and the third circular hole 12*d*, and the second in-between section K2 having a narrow width and provided between the second circular hole 12*c* and the third circular hole 12*d*, the strength of the entire base plate 13 is increased by the parts of the carbon fibers 16 being provided passing through the first and second in-between sections K1 and K2 without being cut off.

That is, on the base plate 13, the strength of the first in-between section K1 is increased by the part of the carbon fibers 16 passing through the first in-between section K1 without being cut off, and the strength of the second in-between section K2 is increased by the part of the carbon fibers 16 passing through the second in-between section K2 without being cut off. By this structure, the strength of the entire base plate 13 is increased even though the shaft insertion hole 12*a*, the first to third circular holes 12*b* to 12*d*, the display opening section 12*e*, and the first and second in-between sections K1 and K2 are provided. Accordingly, the decorative plate 14 which is made of a brittle material is prevented from being deformed and broken.

In this state, external light is applied to the dial 12 through the watch glass 6, and part of this light applied to the dial 12 is applied to the solar panel 9 through the first to third circular holes 12*b* to 12*d* provided in the dial 12. As a result, the solar panel 9 generates electricity.

The electric power generated by the solar panel 9 is supplied to and stored in the secondary battery (not shown) of the timepiece module 8. This electric power in the secondary battery is supplied to the circuit board (not shown) of the timepiece module 8, and various parts such as the plurality of timepiece movements and the antenna are driven by this circuit board.

In this embodiment, the base plate 13 is formed using the carbon fibers 16 as reinforced fibers. As a result, even though the antenna (not shown) which receives standard radio waves is included in the timepiece module 8, radio wave reception by the antenna is not affected by the base plate 13 which is made of the carbon fibers 16, so that standard radio waves are favorably received by the antenna.

Also, in this state, the pointers (not shown) in the main display area are moved above the entire dial 12 so as to point and indicate clock time. Also, in the first sub display area 15*a*, the first sub pointer (not shown) is moved in the first circular hole 12*b* of the dial 12 so as to indicate functional information based on a first mode selected by a switch operation performed on one of the plurality of switch sections 3.

Similarly, in the second sub display area 15*b*, the two second sub pointers (not shown) are respectively moved in the second circular hole 12*c* of the dial 12 so as to indicate functional information based on a second mode selected by a switch operation performed on one of the plurality of switch sections 3.

In the third sub display area 15*c*, the third sub pointer (not shown) is moved in the third circular hole 12*d* of the dial 12 so as to indicate functional information based on a third mode selected by a switch operation performed on one of the plurality of switch sections 3. Also, in the fourth sub display area 15*d*, information such as a date and a day of the week displayed on the display section (not shown) of the timepiece module 8 can be seen through the display opening section 12*e*.

As a result, in this wristwatch, various types of information such as clock time and the above-described first to third functional information is indicated and displayed on the basis of the movements of the pointers in the main display area, the movement of the first sub pointer in the first sub display area 15*a*, the movements of the second sub pointers in the second sub display area 15*b*, and the movement of the third sub pointer in the third sub display area 15*c*. This indicated and displayed information and information such as a date and a day of the week displayed on the display section (not shown) of the timepiece module 8 are seen from outside the wristwatch case 1 through the watch glass 6.

Also, when the wristwatch case 1 of this wristwatch is subject to an external impact, this impact is buffered to a certain degree by the middle frame 11 provided around the outer circumference of the housing 10 of the timepiece module 8. However, part of this impact propagates to the timepiece module 8 in the wristwatch case 1. As a result, the dial 12 provided on the housing 10 receives this part of the impact not buffered by the middle frame 11.

Here, the plurality of projection sections 13*a* provided on the outer circumferential portions of the base plate 13 of the dial 12 and projecting outside the outer circumference of the decorative plate 14 in the plane direction has been held between the flange section 5*a* of the second case 5 of the wristwatch case 1 and the middle frame 11 and, in this state, the dial 12 has been held in the first case 4. Therefore, although the wristwatch case 1 has been subject to the external impact, the base plate 13 is not deformed by the impact since the strength of the base plate 13 has been ensured.

Accordingly, although the wristwatch case 1 has been subject to the external impact, the outer circumferential portion of the decorative plate 14 does not come in contact with the inner circumferential portion of the flange section 5*a* of the second case 5 and, in addition, the decorative plate 14 does not come in contact with the ring-shaped parting member 17 provided on the upper surface of the flange section 5*a* of the second case 5. As a result, even though the decorative plate 14 is made of a brittle material, such as a shellfish including a green turban shell and an abalone shell, or a natural or artificial precious stone including an aventurine, a sapphire, and a jade, this decorative plate 14 is prevented from being damaged and broken.

As such, the dial 12 of this wristwatch includes the base plate 13 which is a sheet-shaped base member acquired by the carbon fibers 16 that are reinforced fibers being woven, and the decorative plate 14 which is a decorative member made of a brittle material and provided on the upper surface of the base plate 13, whereby the strength of the entire dial 12 can be ensured and the decorativeness can be enhanced.

That is, in the dial 12 of this wristwatch, the base plate 13 is formed in a sheet shape achieved by the carbon fibers 16 being vertically and horizontally woven by plain weave, whereby the strength of the base plate 13 can be ensured, and the decorative plate 14 which is made of a brittle material can be prevented from being deformed and broken. Also, since the decorative plate 14 is made of a brittle material such as a shellfish including a green turban shell and an abalone shell, or a natural or artificial precious stone including an aventurine, a sapphire, and a jade, the decorativeness of the decorative plate 14 can be enhanced.

In this embodiment, the dial 12 is provided with a plurality of base openings including the shaft insertion hole 12*a* of the main display area, the first circular hole 12*b* of the first sub display area 15*a*, the second circular hole 12*c* of the second sub display area 15*b*, the third circular hole 12*d* of the third sub display area 15*c*, and the display opening section 12*e* of the fourth sub display area 15*d*, whereby the pointers can be moved in the main display area so as to point and indicate clock time, the first to third sub pointers can be moved in the first to third sub display areas 15*a* to 15*c* so as to indicate and display the first to third sub functions, and a date and a day of the week can be displayed by the fourth sub display area 15*d*.

Accordingly, in the dial 12 of this wristwatch, on the base plate 13, the first and second in-between sections K1 and K2 having narrow widths are between the first circular hole 12*b* and the third circular hole 12*d* and between the second circular hole 12*c* and the third circular hole 12*d* such that the parts of the carbon fibers 16 pass through the first and second in-between sections K1 and K2 without being cut off, whereby each strength of the first and second in-between sections K1 and K2 of the base plate 13 can be ensured, so that the strength of the entire base plate 13 can be increased.

That is, in the base plate 13 of this dial 12, the shaft insertion hole 12*a*, the first to third circular holes 12*b* to 12*d*, and the display opening section 12*e* are formed after the base plate 13 is rotated by 45 degrees with the carbon fibers 16 being vertically and horizontally woven by plain weave, whereby the first in-between section K1 between the first circular hole 12*b* and the third circular hole 12*d* can be provided at a slant angle of 45 degrees toward the middle point between the 10 o'clock side and the 11 o'clock side from the center of the base plate 13. As a result, part of the vertical or horizontal fibers (in the example, the horizontal fibers) among the carbon fibers 16 vertically and horizontally woven by plain weave can be provided passing through the first in-between section K1 without being cut off.

Similarly, on the base plate 13, the second in-between section K2 between the second circular hole 12*c* and the third circular hole 12*d* can be provided at a slant angle of 45 degrees toward the middle point between the 7 o'clock side and the 8 o'clock side from the center of the base plate 13 after the base plate 13 is rotated by 45 degrees with the carbon fibers 16 being vertically and horizontally woven by plain weave. As a result, part of the vertical or horizontal fibers (in the example, the vertical fibers) among the carbon fibers 16 vertically and horizontally woven by plain weave can be provided passing through the second in-between section K2 without being cut off.

Accordingly, on the base plate 13, the strength of the first in-between section K1 can be increased by the part of the carbon fibers 16 passing through the first in-between section K1 without being cut off, and the strength of the second in-between section K2 can be increased by the part of the carbon fibers 16 passing through the second in-between section K2 without being cut off. As a result, even though the base plate 13 is provided with the shaft insertion hole 12*a*, the first to third circular holes 12*b* to 12*d*, the display opening section 12*e*, and the first and second in-between sections K1 and K2, the strength of the entire base plate 13 can be increased.

In the dial 12 of the wristwatch of this embodiment, the base plate 13 is formed using the carbon fibers 16 as reinforced fibers. Accordingly, even though the antenna which receives standard radio waves is included in the timepiece module 8, radio wave reception by the antenna is not affected by the base plate 13 which is made of the carbon fibers 16, so that standard radio waves are favorably received by the antenna.

Also, in the dial 12 of this wristwatch, the base plate 13 includes the sheet materials acquired by carbon fibers 16 being vertically and horizontally woven by plain weave and coated with epoxy resin, and has the structure where these sheet materials have been laminated. Accordingly, the strength of the entire base plate 13 can be sufficiently increased without radio wave reception by the antenna of the timepiece module 8 being affected.

That is, since this base plate 13 includes the sheet materials acquired by carbon fibers 16 being vertically and horizontally woven by plain weave and coated with epoxy resin, and has the structure where these sheet materials have been laminated with their carbon fibers 16 being directionally aligned, part of the carbon fibers 16 of each laminated sheet material can pass through the first and second in-between sections K1 and K2 of the base plate 13 despite the structure where the plurality of sheet materials have been laminated. As a result, the strength of the entire base plate 13 can be further increased.

Moreover, in the dial 12 of this wristwatch, the decorative plate 14 has a plate shape and is made of a brittle material, such as a shellfish including a green turban shell and an abalone shell, or a natural or artificial precious stone including an aventurine, a sapphire, and a jade. Therefore, in the case where a shellfish such as a green turban shell and an abalone shell has been processed to be in a thin plate shape as the decorative plate 14, the design is expressed which is highly decorative as mother-of-pearl work. Also, in the case where a natural or artificial precious stone such as an aventurine, a sapphire, and a jade has been processed to be in a thin plate shape as the decorative plate 14, the design is expressed which gives a sophisticated feeling by using the material itself of the precious stone.

Second Embodiment

Next, a second embodiment related to a wristwatch is described with reference to FIG. 5. Note that sections that are the same as those of the first embodiment shown in FIG. 1 to FIG. 4B are provided with the same reference numerals. This wristwatch has substantially the same structure as that of the first embodiment except that the base plate 20 is formed by glass fibers 21 that are reinforced fibers being woven, as shown in FIG. 5.

Figure 5:
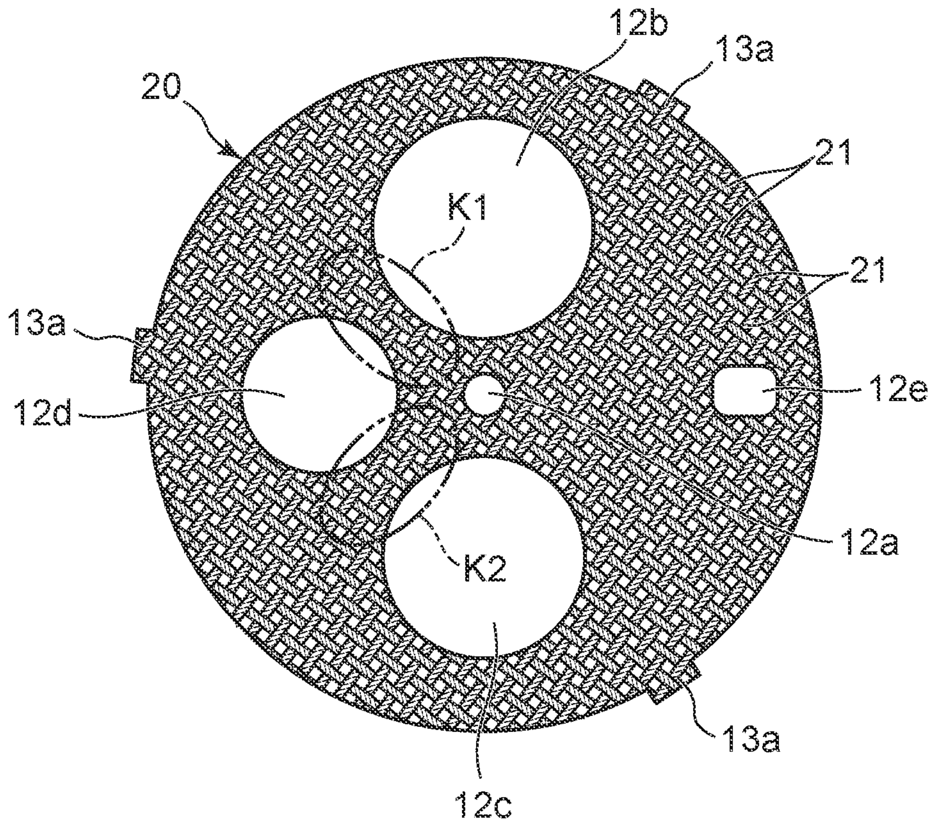
FIG. 5 is an enlarged front view of a base plate in a second embodiment related to a wristwatch.

That is, this base plate 13 includes sheet materials each of which is acquired by glass fibers 21 being vertically and horizontally woven by plain weave and coated with epoxy resin, and has a structure where these sheet materials have been laminated with their glass fibers 21 being directionally aligned, as shown in FIG. 5. In this embodiment as well, part of the vertically and horizontally woven glass fibers 21 is provided passing through the first and second in-between sections K1 and K2 without being cut off, as in the case of the first embodiment. Similarly, in this base plate 20, part of the glass fibers 21 is provided from the center of the base plate 20 having the shaft insertion hole 12*a* to the outer circumferential portion thereof without being cut off, as shown in FIG. 5.

Also, although not shown in the drawing, the timepiece module 8 of this wristwatch is equipped with a GPS antenna for receiving GPS (Global Positioning System) radio waves with a short wave length, instead of the antenna for receiving standard radio waves. In this embodiment, since the base plate 20 is formed of the glass fibers 21, GPS radio waves with a short wave length are received by the GPS antenna without being interrupted.

As such, according to the dial 12 of the second embodiment, the same advantageous effect as that of the first embodiment can be acquired. In addition, since the base plate 20 is formed of the glass fibers 21 as reinforced fibers, even though the timepiece module 8 is equipped with the GPS antenna which receives GPS radio waves with a short wave length, GPS radio waves are not interrupted by the base plate 20 which is made of the glass fibers 21, and unfailingly and favorably received by the GPS antenna.

Also, in the case of the dial 12 of the second embodiment as well, the base plate 13 includes the sheet materials acquired by glass fibers 21 that are reinforced fibers being vertically and horizontally woven by plain weave, and has the structure where these sheet materials have been laminated, whereby the strength of the entire base plate 13 can be sufficiently increased without radio wave reception by the antenna of the timepiece module 8 being affected.

That is, in the dial 12 of the second embodiment, even though the base plate 13 includes the first and second in-between sections K1 and K2 having narrow widths and provided between the first circular hole 12*b* and the third circular hole 12*d* and between the second circular hole 12*c* and the third circular hole 12*d* which are a plurality of base openings, the strengths of the first and second in-between sections K1 and K2 of the base plate 20 are increased by the parts of the glass fibers 21 being provided passing through the first and second in-between sections K1 and K2 of the base plate 20 without being cut off, whereby the strength of the entire base plate 13 is increased, as with the first embodiment.

In the above-described first and second embodiments, the sheet materials are formed by carbon fibers 16 or glass fibers 21 being vertically and horizontally woven by plain weave. However, the present invention is not limited thereto. For example, the sheet materials may be formed by carbon fibers 16 or glass fibers 21 being woven by twill weave. Also, the sheet materials are not necessarily required to be woven by plain weave or twill weave, and may be woven using other weaves.

Also, in the above-described first and second embodiments, the dial 12 is held in the wristwatch case 1 with the plurality of projection sections 13*a* of the base plate 13 being held between the flange section 5*a* of the second case 5 and the middle frame 11. However, a structure may be adopted in which a plurality of recess sections is provided on outer circumferential portions of the base plate 13 in the planar direction, and projection sections corresponding to the recess sections of the base plate 13 are provided on members under the base plate 13 such as the middle frame 11 and the housing 10. With this structure, the projection sections of the middle frame 11 and the housing 10 are fitted into the recess sections of the base plate 13 so as to restrict the position of the base plate 13 in the radial directions, whereby the dial 12 is held in the wristwatch case 1.

Moreover, in the above-described first and second embodiments, in the dial 12, the decorative plate 14 is provided on the base plate 13. However, a structure may be adopted in which the base plate 13 serves as a base member and a decorative member. Also, in a case where the sheet materials formed of the carbon fibers 16 or the glass fibers 21 are desired to serve as a dial, the decorative plate 14 is not necessary.

Furthermore, in the above-described first and second embodiments, the present invention has been applied to a wristwatch. However, the application target is not necessarily required to be a wristwatch. The present invention can be applied to various timepieces such as a travel watch, an alarm clock, a table clock, and a wall clock. Also, the present invention can be applied not only to timepieces but also to various electronic devices such as a portable telephone and a portable terminal.

While the present invention has been described with reference to the preferred embodiments, it is intended that the invention be not limited by any of the details of the description therein but includes all the embodiments which fall within the scope of the appended claims.

What is claimed is:

1. A dial comprising:

a base member having a sheet shape containing reinforced fibers, a decorative member, provided on one surface of the base member, containing a brittle material, wherein the base member and the decorative member are each provided with a plurality of openings, and the plurality of openings of the base member correspond to the plurality of openings of the decorative member, and wherein a fiber in a first direction among the reinforced fibers is provided to pass through a narrow in-between area between adjacent openings among the plurality of openings of the base member without being cut off.

2. The dial according to claim 1, wherein part of the reinforced fibers is provided from center to outer circumference of the base member without being cut off.

3. The dial according to claim 2, wherein the reinforced fibers of the base member are carbon fibers.

4. The dial according to claim 2, wherein the reinforced fibers of the base member are glass fibers.

5. The dial according to claim 2, wherein the base member has a plurality of laminated sheet materials formed of the reinforced fibers being woven.

6. The dial according to claim 1, wherein the reinforced fibers of the base member are carbon fibers.

7. The dial according to claim 1, wherein the reinforced fibers of the base member are glass fibers.

8. The dial according to claim 1, wherein the base member has a plurality of laminated sheet materials acquired by the reinforced fibers being woven.

9. The dial according to claim 1, wherein the decorative member is formed by the brittle material including a shellfish or a natural or artificial precious stone being processed to be in a plate shape.

10. A timepiece comprising the dial according to claim 1.

11. The dial according to claim 1, wherein the reinforced fibers are woven by plain weave, in which the first direction is substantially orthogonal to a straight line connecting between centers of the adjacent openings.

* * * * *